July 6, 1937.  L. E. W. VAN ALBADA  2,086,372
DRIFT SIGHT INDICATOR
Filed Aug. 30, 1935  2 Sheets-Sheet 1

Inventor
L. E. W. van Albada

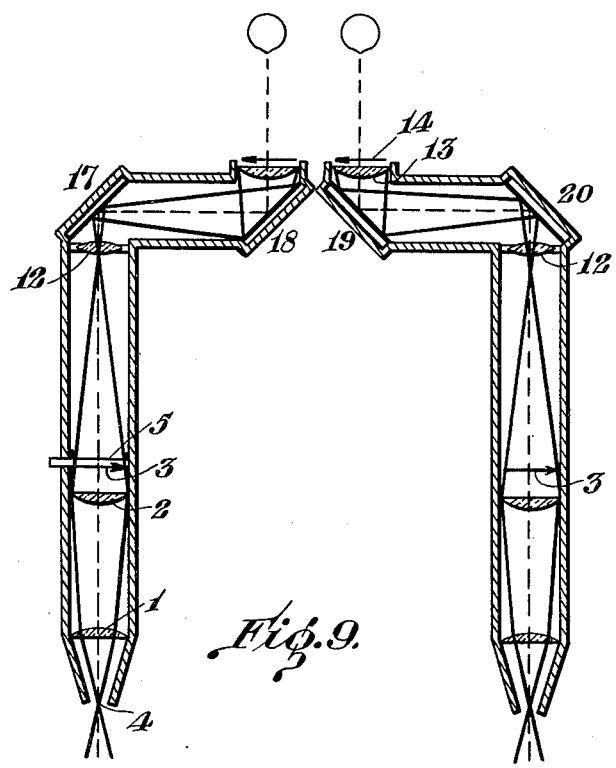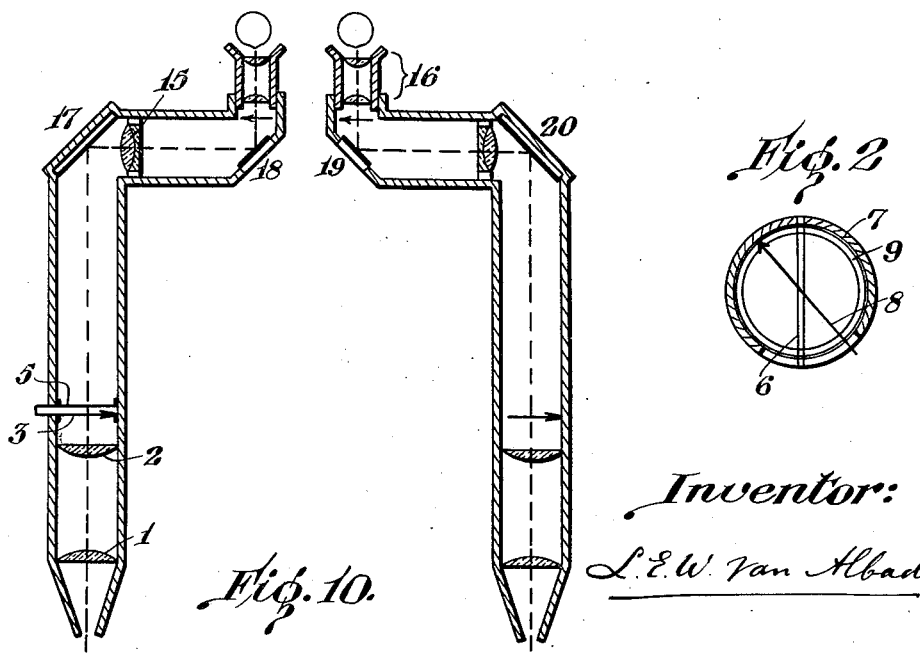

UNITED STATES PATENT OFFICE 2,086,372

DRIFT SIGHT INDICATOR

Lieuwe E. W. van Albada, Bloemendaal, Netherlands

Application August 30, 1935, Serial No. 38,602

8 Claims. (Cl. 88—2.2)

As far as known drift sight indicators, used in actual airplanes, partly consist of a hole, in the bottom of the cockpit, allowing the pilot, by looking down through it, to see the objects on earth pass in a distinct direction. When this direction does not coincide with that of the axis of the airplane, represented by one or more parallel threads, fixed in the hole, the angle of deviation can be measured with aid of a turnable needle to be placed parallelly with the apparent movement of the earthly objects.

In this case the hole seldom permits a wider range of vision than about 10° and must be relatively large.

In other cases a set of 4 lenses is used in a vertical tube, about two inches wide, projecting the image of a part of the surface of the earth in the focal plane of the upper lens, through which the image is visible for one eye, placed in or quite near the axis of the tube at a distance of about 10 inches from the upper lens.

With the aid of one or two mirrors, making an angle of 45° with the adjacent axes of the tube, the image may be seen not only in downward but also in other more convenient directions.

Generally the objects in this image are seen under about the same angle as with the naked eye through a hole and over a range of vision of about 10°.

But these lenses don't give an image free from distortion, which makes the measurement uncertain. It is clear that to define a direction a straight line is required and therefore a rectilinear image is indispensable.

The object of this invention is to procure drift sight indicators, the images of which not only are rectilinear but also, if desired, may extend the range of vision to a much wider field than about 10°, and may be seen suitably magnified.

Figure 1:
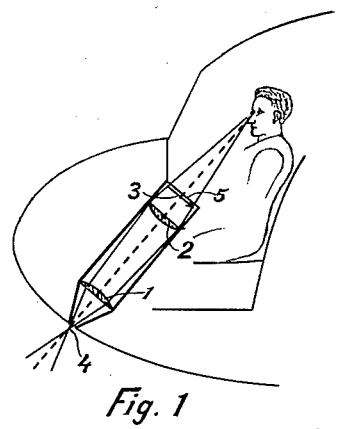
Figure 4:
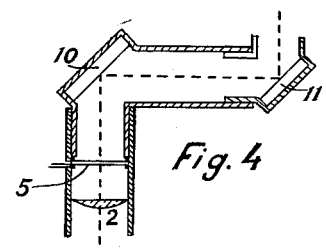
Figure 3:
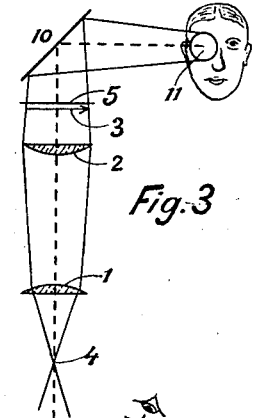
Figure 5:
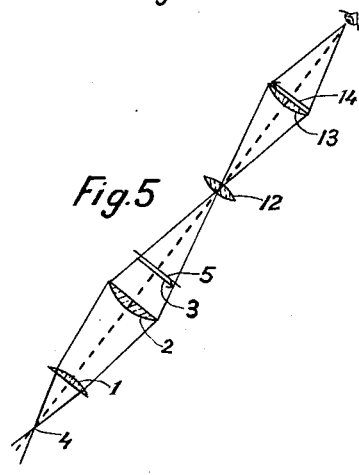
Figure 6:
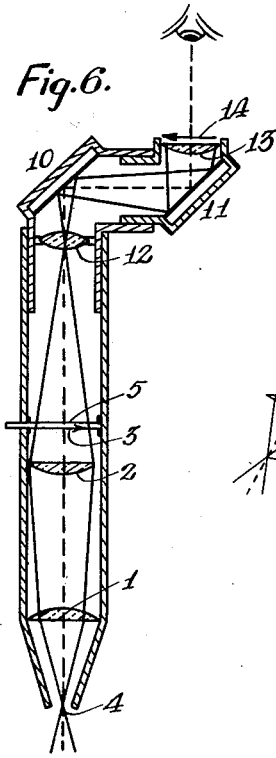
Figure 7:
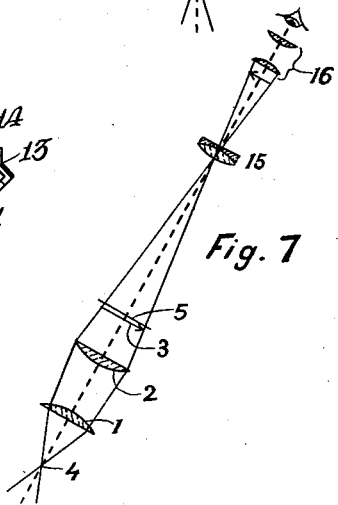
Figure 8:
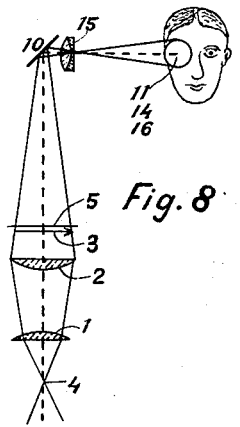

Fig. 1 shows a drift sight indicator in its most simple operative form, placed in the nose of an airplane, like it may be used; Fig. 2 the means for indicating the angle of drift; Fig. 3 a vertical drift sight indicator provided with knee-shaped rotatable tubes containing mirrors as shown in Fig. 4; Fig. 5 a drift sight indicator provided with means to redress the first reversed image; Fig. 6 the same indicator vertically and provided with rotatable tubes and mirrors; Fig. 7 a drift sight indicator provided with a telescopic objective and an ocular to extend the range of vision and to redress and magnify the first reversed image; Fig. 8 the same indicator vertically provided with knee-shaped rotatable tubes with mirrors; Fig. 9 a binocular drift sight indicator composed of two indicators as shown in Fig. 6, and Fig. 10 a binocular drift sight indicator composed of two indicators as shown in Fig. 8.

The device, represented in Fig. 1, consists principally of an objective of only two lenses 1 and 2, the reversed image of which shows the objects at least at natural size.

To get the image flat and free from distortion preferably two substantially equal plano-convex lenses 1 and 2 are used, tops inside and spaced at about 63% of the focal length of one lens, the focal length of the objective thus amounting to about 74% of that of one lens.

The small image 4, that the objective forms of the eyepupil of the pilot, is lying at some distance before the front lens and is the real working entrance pupil of the system.

If the room in the cockpit allows such the range of vision can be carried up to about 50° only by increasing the diameter of the lenses. The issuing principal rays, converging towards the axis, the whole image can be surveyed by the eye at the point of convergence, at a distance of at least 10 inches from the image. The image 3 can also be viewed by a lens, with a focal length of about 10 inches, at the above mentioned point of convergence, giving a virtual image at a great distance.

Fig. 2 shows the threads 6, fixed in the tube 7, parallel to the axis of the airplane and the needle or pointer 8, fixed on a ring 9, turnable in the tube, to indicate the angle of drift, threads and needle to be placed in the plane of image 3.

Fig. 3 represents a vertical drift sight indicator containing the above mentioned lenses 1 and 2, the threads and needle of Fig. 2, in this and following figures numbered 5, and two mirrors 10 and 11 in turnable knee-shaped tubes, means to bring the image conveniently within the reach of the pilot's eye.

These means are separately shown in Fig. 4. The knee-shaped tube containing mirror 10 is turnable in the main tube and the knee-shaped tube containing mirror 11 rotatable in the first one.

If the room in the cockpit and the place of the pilot require a long, relatively narrow tube, the device shown in Fig. 5 may be useful. An objective of the same type as described above forms the image 3. At a distance, about twice its focal length, is placed a symmetrical lens 12, that forms a reversed and also rectilinear image 14 of the same size and at the same distance behind itself.

In or near image 14 is placed a fieldlens 13, that forms an image of lens 12 at least at 10 inches from image 14, whereabout the eye can see it distinctly.

The threads 5, indicating the axis of the airplane, are fixed in the plane of image 3, whilst the turnable needle conveniently is placed in a ring in the plane of image 14.

Fig. 6 shows this drift sight indicator vertically provided with two mirrors 10 and 11 in turnable tubes to bring the image conveniently within the reach of the pilot's eye.

To get a larger range of vision and the possibility to see the image magnified the device of Fig. 7, may be useful. Instead of a symmetrical lens, as shown in Figs. 5 and 6, a telescopic objective 15 (Fig. 7) may be used, that forms a reversed and reduced rectilinear image of image 3 in the focal plane of an ocular 16, showing the object under a wider angle and suitably magnified.

Fig. 8 shows the same device provided with mirrors 10 and 11 in tubes turnable as described above.

To estimate the distance from the surface of the earth, from clouds or other airplanes more securely and to judge of the form of the objects on earth two drift sight indicators as shown in Fig. 6 and in Fig. 8 may be combined parallelly and symmetrically to form a binocular drift sight indicator as represented in Fig. 9 and Fig. 10.

In this case the knee-shaped tubes, containing the mirrors, are not rotatable but fixed so, that the pairs of mirrors 17 and 18, as well as 19 and 20, steadily are parallel; the parallel axes of the two lenses 13 and those of the two oculars 16 are separated as far as the eyes.

The binocular drift sight indicators can also be used for measuring distances with the aid of stereoscopical scales in the planes of the images as usual in range-finders.

I claim:

1. A drift sight indicator consisting of: a tube, containing a sighting objective of only two substantially equal plano-convex lenses, spaced, tops inside, at about 63% of the focal length of one lens; in the thus formed flat and distortion free plane of the image, lying behind the second lens and covering, according to the diameter of the lenses, a field up to 50°, one or more fixed threads parallel to the axis of the airplane and a turnable needle.

2. A drift sight indicator consisting of: a tube, containing a sighting objective of only two substantially equal plano-convex lenses, spaced, tops inside, at about 63% of the focal length of one lens; in the thus formed flat and distortion free plane of the image, lying behind the second lens and covering, according to the diameter of the lenses, a field up to 50° one or more fixed threads parallel to the axis of the airplane and a turnable needle; two kneeshaped tubes, the first turnable in the tube, containing the objective, the second in the first one, each provided in the knee with a plane mirror, making equal angles with the axes of their tube.

3. A drift sight indicator consisting of: a tube, containing a sighting objective of only two substantially equal plano-convex lenses, spaced, tops inside, at about 63% of the focal length of one lens; in the thus formed flat and distortion free plane of the image, lying behind the second lens and covering, according to the diameter of the lenses, a field up to 50°, one or more fixed threads parallel to the axis of the airplane and a turnable needle; a biconvex lens, at about twice its focal length from the image, projecting and reversing it on a fieldlens at the exit end of the tube.

4. A drift sight indicator consisting of: a tube, containing a sighting objective of only two substantially equal plano-convex lenses, spaced, tops inside, at about 63% of the focal length of one lens; in the thus formed flat and distortion free plane of the image, lying behind the second lens and covering, according to the diameter of the lenses, a field up to 50°, one or more fixed threads parallel to the axis of the airplane and a turnable needle; two kneeshaped tubes, the first turnable in the tube, containing the objective, the second in the first one, each provided in the knee with a plane mirror, making equal angles with the axes of their tube; a biconvex lens, at about twice its focal length from the image, projecting and reversing it on a fieldlens at the exit end of the tube.

5. A drift sight indicator consisting of: a tube, containing a sighting objective of only two substantially equal plano-convex lenses, spaced, tops inside, at about 63% of the focal length of one lens; in the thus formed flat and distortion free plane of the image, lying behind the second lens and covering, according to the diameter of the lenses, a field up to 50°, one or more fixed threads parallel to the axis of the airplane and a turnable needle; a telescopic objective projecting and reversing the image in the focal plane of an ocular at the exit end of the tube.

6. A drift sight indicator consisting of: a tube, containing a sighting objective of only two substantially equal plano-convex lenses, spaced, tops inside, at about 63% of the focal length of one lens; in the thus formed flat and distortion free plane of the image, lying behind the second lens and covering, according to the diameter of the lenses, a field up to 50°, one or more fixed threads parallel to the axis of the airplane and a turnable needle; two kneeshaped tubes, the first turnable in the tube, containing the objective, the second in the first one, each provided in the knee with a plane mirror, making equal angles with the axes of their tube; a telescopic objective projecting and reversing the image in the focal plane of an ocular at the exit end of the tube.

7. A binocular drift sight indicator: two symmetrically combined drift sight indicators, each consisting of a tube with two fixed knees, at every knee a plane mirror making equal angles with the axes of the adjacent parts of the tube so, that the mirrors are parallel; each tube containing a sighting objective of only two substantially equal plano-convex lenses, spaced, tops inside, at about 63% of the focal length of one lens and a biconvex lens at about twice its focal length from the image, projecting and reversing it on a fieldlens at the exit end of the tube; in one of the image planes one or more fixed threads parallel to the axis of the airplane and a turnable needle.

8. A binocular drift sight indicator: two symmetrically combined drift sight indicators, each consisting of a tube with two fixed knees, at every knee a plane mirror making equal angles with the axes of the adjacent parts of the tube so, that the mirrors are parallel; each tube containing a sighting objective of only two substantially equal plano-convex lenses, spaced, tops inside, at about 63% of the focal length of one lens and a telescopic objective projecting and reversing the image in the focal plane of an ocular at the exit end of the tube; in one of the image planes one or more fixed threads parallel to the axis of the airplane and a turnable needle.

L. E. W. VAN ALBADA.